US011968414B1

(12) United States Patent
Aberman et al.

(10) Patent No.: US 11,968,414 B1
(45) Date of Patent: Apr. 23, 2024

(54) SYSTEMS AND METHODS FOR FORECASTING PROGRAM VIEWERSHIP

(71) Applicant: SINTEC MEDIA LTD., Jerusalem (IL)

(72) Inventors: Sam Aberman, London (GB); Binyamin Even, Efrat (IL); Oshri Barazani, Tel Te'Omin (IL); Patrick Blackwill, Tamworth (GB)

(*) Notice: Subject to any disclaimer, the term of this patent is extended or adjusted under 35 U.S.C. 154(b) by 0 days.

(21) Appl. No.: 16/444,514

(22) Filed: Jun. 18, 2019

Related U.S. Application Data

(60) Provisional application No. 62/686,402, filed on Jun. 18, 2018.

(51) Int. Cl.
*H04N 21/25* (2011.01)
*G06N 20/00* (2019.01)
(Continued)

(52) U.S. Cl.
CPC ............ *H04N 21/252* (2013.01); *G06N 20/00* (2019.01); *H04N 21/2353* (2013.01); *H04N 21/237* (2013.01)

(58) Field of Classification Search
CPC ........ G06N 3/006; G06N 5/022; G06N 20/00; G06N 3/084; G06N 20/10; G06N 3/02; G06N 3/0445; G06N 3/0454; G06N 5/003; G06N 5/025; G06N 5/04; G06N 7/005; G06N 20/20; G06N 5/02; G06N 3/08; G06N 3/088; G06N 3/0472; G06N 3/04; G06N 3/126; G06N 7/023; G06N 3/0436; G06N 3/049; G06N 3/105; G06N 5/048
See application file for complete search history.

(56) References Cited

U.S. PATENT DOCUMENTS 6,308,168 B1  10/2001  Dovich et al.
8,589,227 B1  11/2013  Bridge et al.
(Continued)

FOREIGN PATENT DOCUMENTS

WO     0107985 A2     2/2001

OTHER PUBLICATIONS

Youngsub Han, A Study of Aspect-Based Sentiment Analysis in Social Media, May 2017, Towson University (Year: 2017).*
(Continued)

*Primary Examiner* — Ann J Lo
*Assistant Examiner* — Charles C Kuo
(74) *Attorney, Agent, or Firm* — DLA PIPERL LLP (US)

(57) ABSTRACT

Systems and methods for predicting who is watching a program are disclosed. Text related to the program can be reviewed, the text comprising: plot information, sub-title information, summary information, script information, or synopsis information, or any combination thereof. Pre-determined genre words and pre-determined keywords can be determined based on machine learning analysis of historical programs. Words from the text which are relevant words can be determined, the relevant words being words that help identify genre words or keywords. How closely the relevant words coincide to the pre-determined genre words can be determined by generating a breakdown of how many relevant words are the pre-determined genre words and the pre-determined keywords. It can be predicted who will watch the program based on the breakdown.

42 Claims, 17 Drawing Sheets

(51) Int. Cl.
*H04N 21/235* (2011.01)
*H04N 21/237* (2011.01)

(56) References Cited

U.S. PATENT DOCUMENTS

| | | | |
|---|---|---|---|
| 9,053,535 | B2 | 6/2015 | Florent et al. |
| 9,723,372 | B1 | 8/2017 | McLean et al. |
| 9,785,955 | B2 | 10/2017 | Secretan et al. |
| 2001/0020236 | A1 | 9/2001 | Cannon |
| 2002/0082953 | A1 | 6/2002 | Batham et al. |
| 2003/0023489 | A1 | 1/2003 | McGuire et al. |
| 2005/0091287 | A1 | 4/2005 | Sedlar |
| 2005/0277096 | A1 | 12/2005 | Hendrickson et al. |
| 2006/0041480 | A1 | 2/2006 | Briggs |
| 2006/0168613 | A1 | 7/2006 | Wood et al. |
| 2008/0019545 | A1 | 1/2008 | Jhung |
| 2008/0020361 | A1 | 1/2008 | Kron et al. |
| 2008/0022301 | A1 | 1/2008 | Aloizos |
| 2008/0126192 | A1 | 5/2008 | Patel et al. |
| 2008/0195458 | A1* | 8/2008 | Anschutz ........... G06Q 30/0254 705/14.52 |
| 2008/0228543 | A1 | 9/2008 | Doe |
| 2008/0250447 | A1 | 10/2008 | Rowe et al. |
| 2008/0286735 | A1 | 11/2008 | Cusano |
| 2009/0172597 | A1 | 7/2009 | Mercer |
| 2010/0235219 | A1 | 9/2010 | Merrick et al. |
| 2011/0288907 | A1 | 11/2011 | Harvey et al. |
| 2012/0041318 | A1 | 2/2012 | Taylor |
| 2012/0084064 | A1 | 4/2012 | Dzenis et al. |
| 2012/0158485 | A1 | 6/2012 | Ogawa |
| 2013/0036028 | A1 | 2/2013 | Patt et al. |
| 2013/0080264 | A1 | 3/2013 | Umeda |
| 2013/0179917 | A1 | 7/2013 | Gu et al. |
| 2013/0226691 | A1 | 8/2013 | Chatow et al. |
| 2013/0311408 | A1* | 11/2013 | Bagga ................... G06N 20/00 706/12 |
| 2015/0029185 | A1 | 1/2015 | Ikits |
| 2015/0242588 | A1 | 8/2015 | Audigier et al. |
| 2016/0007093 | A1* | 1/2016 | Liu ...................... H04N 21/251 725/32 |
| 2016/0037197 | A1 | 2/2016 | Kitts et al. |
| 2017/0142465 | A1 | 5/2017 | Ray et al. |
| 2017/0193547 | A1 | 7/2017 | Berrett et al. |
| 2017/0255971 | A1 | 9/2017 | Box et al. |
| 2018/0225709 | A1 | 8/2018 | Ferber et al. |
| 2019/0139079 | A1 | 5/2019 | Nataf |
| 2019/0147033 | A1 | 5/2019 | Morse |
| 2019/0251593 | A1 | 8/2019 | Allouche |

OTHER PUBLICATIONS

Jesse Vig et al., Tagsplanations: Explaining Recommendations Using Tags, Feb. 2009, IUI'09 pp. 47-56 (Year: 2009).*
Marton Mestyan et al., Early Prediction of Movie Box Office Success Based on Wikipedia Activity Big Data, Aug. 2013, PLOS ONE Aug. 2013 vol. 8 Issue 8 e71226 (Year: 2013).*
Kim, Taegu et al., Box Office Forecasting Using Machine Learning Algorithms Based on SNS data, 2015, International Journal of Forecasting 31 (2015), pp. 364-390 (Year: 2015).*
Meyer et al. The Accuracy of Television Network Rating Forecasts: The Effects of Data Aggregation and Alternative Models, 2005, Model Assisted Statistics and Applications 1 (2005, 2006) pp. 147-155 (Year: 2005).*
https://en.wikipedia.org/wiki/XGBoost; dated Jun. 1, 2019, 2 pages.
https://research.fb.com/prophet-forecasting-at-scale/, dated Jun. 12, 2019, 9 pages.
https://nlp.stanford.edu/projects/glove/, dated Jun. 3, 2019, 3 pages.
https://en.wikipedia.org/wiki/Overfitting, dated Jun. 15, 2019, 6 pages.
https://en.wikipedia.org/wiki/Hyperparameter_(machine_learning).
https://en.wikipedia.org/wiki/Cross-validation_(statistics).
File History of U.S. Appl. No. 16/554,934, filed Aug. 29, 2019 retrieved Mar. 25, 2020.
File History of U.S. Appl. No. 16/714,562, filed Dec. 13, 2019 retrieved Mar. 25, 2020.
U.S. Appl. No. 16/554,934, filed Aug. 29, 2019.
U.S. Appl. No. 16/714,562, filed Dec. 13, 2019.
U.S. Appl. No. 16/554,934, filed Sep. 7, 2021.
U.S. Appl. No. 16/714,562, filed Sep. 7, 2021.
U.S. Appl. No. 16/554,934.
U.S. Appl. No. 17/565,782.
International Search Report and Written Opinion for International Application No. PCT/US2020/059450, dated Jan. 27, 2021, 7 Pages.
Operative: "How it Works," Software Operative, Apr. 5, 2017, 6 Pages, [Retrieved on Mar. 17, 2022] Retrieved from URL: https://web.archive.org/web/20170405220124/ http://www.operative.com/how-it-works/.
Operative Media: "Bulk Data Loader User's Guide," Operative.one, Jan. 6, 2016, 80 Pages, [Retrieved on Mar. 17, 2022].
Operative One: "Simplify the Business of Advertising," 2017, 1 Page, [Retrieved on Feb. 9, 2023] Retrieved from URL: http://www.operative.com/wp-content/uploads/2017/01/Operativeone_InfoSheet.pdf.
WIKIPEDIA: "Overfitting," Archived on Jul. 31, 2019, 5 Pages, Last Edited Jul. 9, 2019, [Retrieved on Nov. 5, 2019] Retrieved from URL: https://en.wikipedia.org/wiki/Overfitting.
U.S. Appl. No. 16/714,562.
U.S. Appl. No. 17/562,782.
U.S. Appl. No. 16/444,514.

* cited by examiner

FIGURE 3

| | dog | cat | computer | animal | mouse |
|---|---|---|---|---|---|
| dog | 0 | 4 | 0 | 2 | 1 |
| cat | 4 | 0 | 0 | 3 | 5 |
| computer | 0 | 0 | 0 | 0 | 3 |
| animal | 2 | 3 | 0 | 0 | 2 |
| mouse | 1 | 5 | 3 | 2 | 0 |

FIGURE 9

Empire Boo Boo Kitty @EmpireBBK · 4h
Before You Fall Asleep Everyday, Say Something Positive To Yourself! #empire
empirefox #inspiration priyankaangadi @Pribengaluru · Jun 10
Aketcha's story on  is by far the best origin stories of the season and also one of the best episodes shot in television history
WestworldS03

♡ 2    ⟲ 11    ♡ 58    ✉

SYSTEMS AND METHODS FOR FORECASTING PROGRAM VIEWERSHIP

CROSS-REFERENCE TO RELATED APPLICATIONS

This application claims the benefit of U.S. Provisional Patent Application No. 62/686,402, filed Jun. 18, 2018 the disclosures of which is hereby incorporated by reference in its entirety.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 3 is an example of a co-occurrence matrix, according to aspects of the disclosure.

FIG. 9 illustrates an example of how an IMDB.com© identifier can be found using a WIKIPEDIA page, according to aspects of the disclosure.

Figure 1:
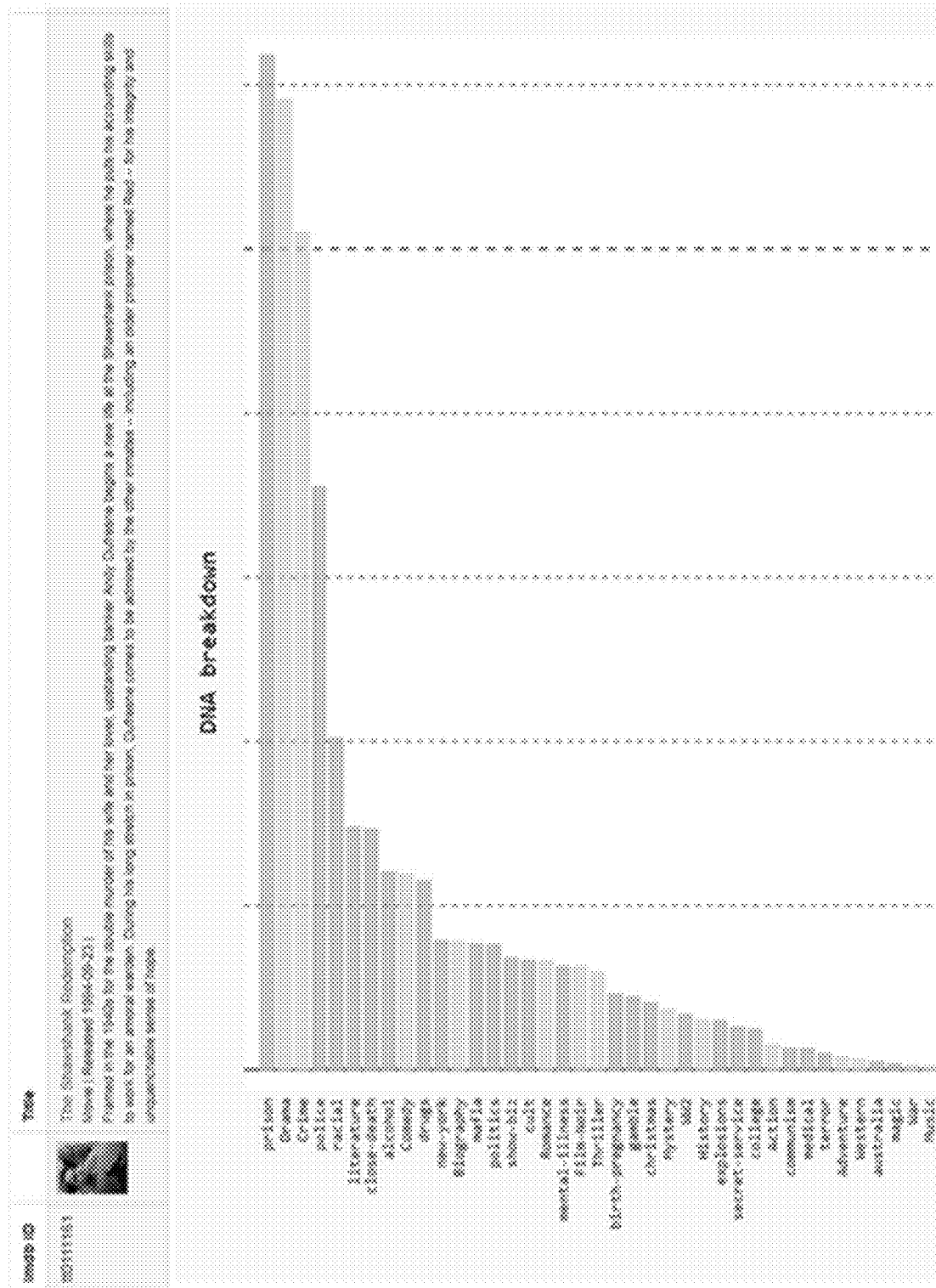
FIG. 1 is an example DNA analysis of an algorithm calculated for a movie, according to aspects of the disclosure.

The drawings are not necessarily to scale, or inclusive of all elements of a system, emphasis instead generally being placed upon illustrating the concepts, structures, and techniques sought to be protected herein.

DETAILED DESCRIPTION OF ASPECTS OF THE DISCLOSURE

Systems and methods for forecasting program viewership are provided. First, training (e.g., deep machine learning) can be done against enriched historical data which can result in a forecast model for a program (e.g., a movie, a show in a series). Second, forecasting can be done against the enriched future schedule data utilizing the previously trained model.

Many types of data can be analyzed using the systems and methods described herein, comprising: historical ratings data, historical schedule data, or historical content metadata, or any combination thereof.

Historical Ratings Data. In some embodiments, the core data for these processes can be provided by the customer (e.g., a cable station that wishes to sell advertising for certain programs). The historical ratings data at various levels of granularity can be provided to the customer by a rating agency (e.g., Nielsen, GfK, Kantar, Comscore). The rating agency can collect data from multiple sources, comprising in some embodiments a weighted audience panel. The rating agency data can comprise a summary of ratings measurements (e.g., ratings for demographic groups by time unit); and/or accompanying information for the program (e.g., network, time, program name, duration). In addition to any rating agency data, the customer can have their own rating information, or may have competitor rating information. Additional data sources can also be used by the customer, such as set-top-box or digital device viewing data.

Historical Schedule Data. Basic schedule ratings data can be provided by a ratings agency. In addition, the customer's own scheduling data can be used. It can include additional information on the aired content, content airing patterns (e.g., series, repeats), breakdown of the content with break information (e.g., commercial and promotion). Sources such as online publishers of Electronic Program Guides (EPGs) can also be used for schedule data.

Historical Content Metadata. Ratings agencies may not have much information on the aired program beyond the program name and occasionally a genre descriptor. A broadcaster may have metadata in a Broadcast Management System (BMS) and/or a Rights Management System (RMS). These systems can provide input such as content types, a year of production, a distributor, cast members, box office stats, etc. This type of information may also be obtained by a customer from a third party resource.

In some embodiments, Machine Learning (ML) and Neuro Linguistic Programming (NLP) algorithms can be utilized. In some embodiments, the systems and methods can take into consideration, for example, the following: scheduling time, rating by basic audience demographics, content metadata, content analysis (e.g., which may be referred to herein as a content DNA analysis), audience engagement with content metrics (e.g., which may be referred to herein as BUZZ), competitors viewership impact, series extended trend analysis, or advanced time series analysis, or any combination thereof.

In some embodiments, long data sets (e.g., 2-3 years of historical data) can be used for the forecasting. In other embodiments, shorter data sets (e.g., 4-8 weeks) can be utilized. In other embodiments, long and shorter data sets can be used.

EXAMPLE ALGORITHMIC PROCESSES

The forecast system can predict future viewership (e.g., sometimes referred to as ratings). In some embodiments, the forecast system can predict viewership: within a specific audience segment, for a specific schedule time, or for a specific playback period (e.g., for a specific scheduled long form content such as event, movie, episode of series, etc.), or any combination thereof. In some embodiments, the forecast system can predict the affinity of an audience segment to a specific schedule time and scheduled content. In other embodiments, a content similarity analysis can be used to better predict viewership success.

In some embodiments, several algorithmic subcomponents can be utilized, including, but not limited to, the following:
- Time-series forecaster algorithm
- Content finder/matcher algorithm
- Content-DNA analysis algorithm
- Content-DNA analysis enricher algorithm
- Social-Buzz analysis algorithm
- Social-Buzz analysis enricher algorithm
- An overarching algorithm (e.g., a deep learning algorithm such as XGBOOST—see, for example, https://en.wikipedia.org/wiki/Xgboost, which is incorporated by reference in its entirety, for background information).

Figure 8:
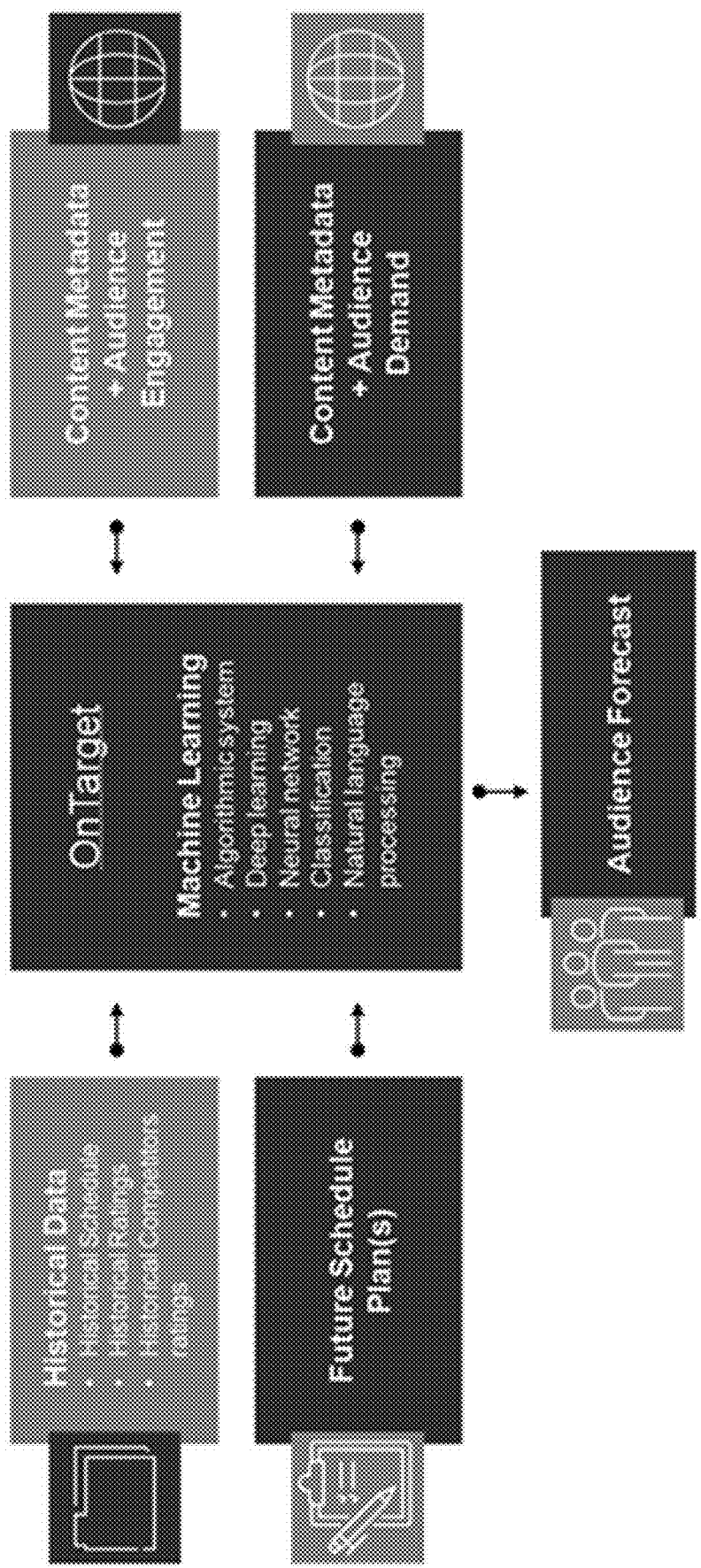
FIG. 8 illustrates example machine learning components and example types of data used to make forecasts, according to aspects of the disclosure.

In some embodiments, the overarching algorithm can comprise multiple components (e.g. any combination of subcomponents 1-7 above), and can also utilize additional forecasting impacting features, including, but not limited to: audience demographic and/or psychographic descriptors, analysis of historical viewership of the specific program or similar programs, broadcast date and/or time related attribute (e.g., date, time, day in year, week day, holidays), content duration and/or advertising break utilization, playback period (e.g., live, same day as live, C3 (e.g., viewed with same commercials within three days of broadcast), C7 (e.g., viewed with same commercials within seven days of broadcast), program pattern indicators, or (e.g., live, network original, network premier, repeat), or any combination thereof. The overarching algorithm can comprise XGBOOST, or another deep-learning algorithm, such as a decision tree and/or Long Short Tem Memory (LSTM). FIG. 8 illustrates various machine learning components, and also various types of data, that can be used in the systems and methods described herein in order to make forecasts.

TIME-SERIES FORECASTER ALGORITHM

Time-series forecasting algorithms can predict the future based on models fit on historical data. The time-series forecaster component can learn the historical viewership of a given series, and/or the related airing of same/similar content, and can predict the viewership of the next airing based on this analysis.

Multiple time-series models can be used in the forecasting system, comprising a Prophet Algorithm and/or linear and/or polynomial regression. The Prophet algorithm can consider linear and/or logistic growth curve trends, and/or any combination of annually, monthly and weekly cyclicality, and/or a user-provided list of important time attributes including exceptions such as holidays. Background information on the Prophet Algorithm can be found at https://research.fb.com/prophet-forecasting-at-scale/, which is incorporated by reference in its entirety.

CONTENT FINDER/MATCHER ALGORITHM

Carrying out a data enrichment from web sources can require content identification across multiple web sources. Data available for such content identification can be very limited (e.g., only using content name). The forecasting system can use a content finder and/or matcher algorithm based on multiple web sources that tries to find similar aired content based on a series of attributes being evaluated (e.g., similar channel, similar date & time, similar year of release, similar genres, similar cast, similar director). The output of this process can be matched pointers to the content in multiple web sources that can be used for data enrichment. For example, if a user is interested in the Wonder Woman movie from 2017, the content finder and/or matcher algorithm could search multiple pre-designated web sources for "Wonder Woman", "2017" etc., and keep adding in attributes until only one program is returned. In other embodiments, more than one program can be returned, or the algorithm can indicate a probability that the returned program is the one the user wants.

CONTENT DNA ANALYSIS ALGORITHM

The content DNA engine was developed due to a need to represent the content (e.g. what the content is about) in a numerical manner that could be fed into the overarching algorithm. This can be done by generating a fixed sized vector of numbers (e.g., scoring) per contextual topics.

In some embodiments, methods and systems for predicting who is watching a program can comprise: review text related to the program, the text comprising: plot information, sub-title information, summary information, script information, or synopsis information, or any combination thereof; determine pre-determined genre words and pre-determined keywords based on machine learning analysis of historical programs; determine which words from the text are relevant words, the relevant words being words that help identify genre words or keywords; and determine how closely the relevant words coincide to the pre-determined genre words by generating a DNA breakdown of how many relevant words are the pre-determined genre words and the pre-determined keywords; and predict who will watch the program based on the DNA breakdown.

There are many data sets available (e.g., web, services) that can provide attributed topics (e.g., genre) for content. In some embodiments, rather than use a limited topic set and binary values (e.g., content is romance (1)+comedy (1)), but other topics get a (0)), a scoring value (e.g., content is 70% romance and 30% comedy) can be used. In this way, deep learning technology can be used with a large content data set. An artificial neural network (ANN) can thus be used on thousands of programs (e.g., movies and series episodes). For example, in some embodiments a database including information on 85,000 movies and 50,000 series can be utilized. The input layer to the ANN can be text about and/or from all the programs. The text can comprise commonly used short synopsis, plot description, original scripts (when available) and subtitles. In some embodiments, subtitle information can be used before the other types of text, as it can generate more accurate forecasting.

The text can be transformed from word embeddings to a fixed-size vector of length 780, using, for example, using Stanford's GloVe Algorithm. Background information on the GloVe Algorithm can be found at https://nlp.stanford.edu/projects/glove/, which is incorporated by reference in its entirety.

Each element in the vector can represent a "cluster" of words, and the value of the cluster can be the amount of "presence" of this cluster in the text of the content.

Each cluster can represent a general concept and/or subject and/or idea, and each word in the cluster can relate to this idea. For example, two example generated clusters can be:

{india,goa, Bengal,assam,Ceylon,indian,Andhra, tamil}{scam, embezzlement, obstruction, bribery, payoff, cheating, evasion, insider, rigging, fixing, forgery, scheme, corruption, blackmail, multimillion, perjury, theft, misuse, racketeering, extortion, fraud, graft, collusion, peddling, bribe}

In the second cluster, there are words that are not directly related (e.g., multimillion and bribe), but because the algorithm can detect that those words often come together, they can be clustered together.

The output layer of the ANN can initially be genres. For example, in some embodiments, a selected list of 26 values picked from Internet Movie Database (e.g., IMDB.com©), WIKIPEDIA, and an entity's Broadcast Management System (IBMS) can be utilized as genres. In this way, the ANN can actually learn to predict the genres of the program and their significance from the text of the program.

In addition, in some embodiments, the accuracy of the prediction can be increased by further improving the DNA values by adding the ability to score against commonly used keywords associated with content. A large matrix of programs X keywords associated with these programs can be used. For example, 16,000+ programs and thousands of keywords associated with those programs can be used. For each of the 16,000+ movies, a bitmap against all the keywords can be created. A 1 can be designated if the keyword belongs to the movie and 0 can be designated if not. A pre-defined threshold can be applied, and keywords that appear less times than the pre-defined threshold can be deleted.

A co-occurrence matrix (e.g., dim: (number of keywords)×(number of keywords))—i.e. how many times each keyword appeared with each other keyword) can be created. An example of a co-occurrence matrix is FIG. 3. This matrix can be normalized by a matrix diagonal, which can indicate how many times a keyword appeared with itself, or in other words how many times it appeared in general, so we divided each row by this value.

At this stage, a vector representation for each keyword can be created. The keywords can then be clustered using the vector representations (e.g., using a co-occurrence algorithm in some embodiments). In this way, clusters of similar keywords can be generated, which clusters can be based on the likelihood that those keywords will appear together. The calculated clusters can be reviewed manually and the clusters can be labeled with a name.

For example, the following words could be in a cluster:
christmas
christmas-carol
christmas-decorations
christmas-eve
christmas-gift
christmas-lights
christmas-party
christmas-present
christmas-tree This cluster can be labeled "Christmas". When keyword clusters such as these (e.g., 35 clusters such as Christmas, birth/children, New York, police) are added to the 26 genres (e.g., drama, comedy, sci-fi), the total length of the DNA representation is, in this example, 26+35=61. In some embodiments, both genres and keyword clusters can be customized. In other embodiments, the number and names of genres can be fixed, but the keyword clusters can be customized. For example, a user could determine to use any number of keyword clusters (e.g., 35 to 135).

Using this methodology, FIG. 1 provides an example DNA analysis of the algorithm calculated for the movie "Shawshank Redemption". The gold/yellow bars are the "standard" commonly-used genres, and the silver/gray bars are the additional keywords that were added that allowed the programs to be represented in more depth (e.g., in the Shawshank Redemption example, the keyword "prison" was the most significant).

CONTENT DNA ANALYSIS ENRICHER ALGORITHM

The DNA enricher role is to get text about the movie and pass it via the Content DNA engine for generation of the topic scoring. Once a content is identified, the enricher is seeking for the subtitles, or other text related to the movie (AKA Fallback process) and generates the DNA.
We frequently use the IMDB.com© ID of the movie as a validator for the correct subtitles (e.g. allocate subtitles files named with the IMDB.com© ID reference).

SOCIAL-BUZZ ANALYSIS ALGORITHM

Figure 6:
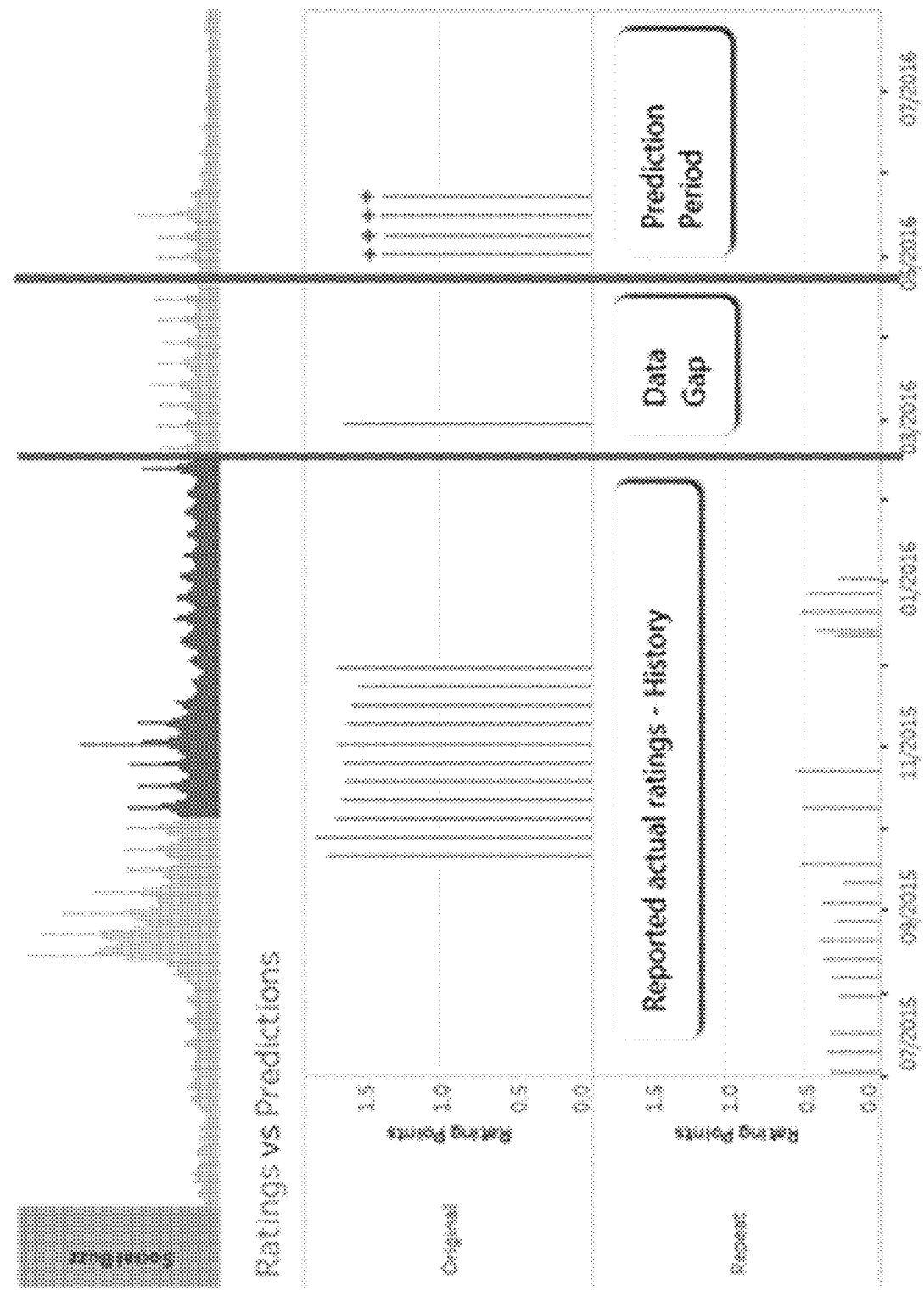
FIG. 6 illustrates an example of known data, gap and forecast periods, according to aspects of the disclosure.
Figure 7:
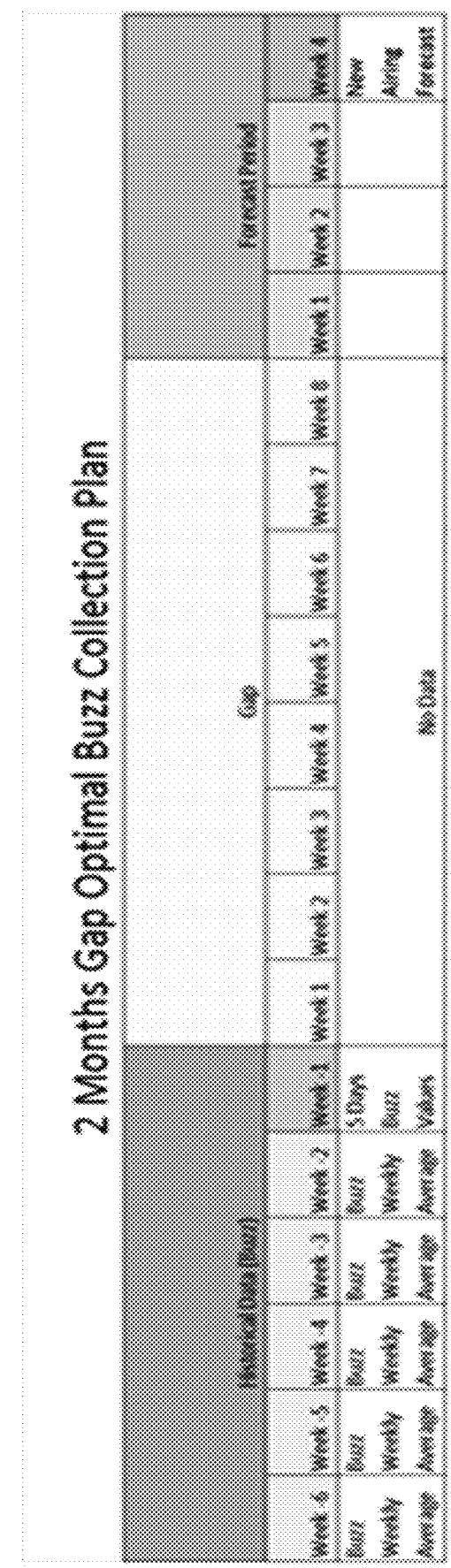
FIG. 7 illustrates an example of gaps which can help evaluate certain features, according to aspects of the disclosure.

The social buzz component can provides insights, collected from various web data sources, about the "trendiness" of programs. For example, FIGS. 6 and 7 illustrate some example buzz data. To-date data referencing the aired content from sources like Social Media (TWITTER, FACEBOOK© etc.) and page visits statistics (WIKIPEDIA), can be collected and used and to train a machine deep learning (ML) model (e.g., the XGBOOST model) that can learn, given a "BUZZ pattern", the predicted viewership of a particular program. As much of this data can exist long before the content goes to air, it can provide a unique source of potential insight on intent to watch this content. There can be a significant correlation between the BUZZ pattern and the ratings. For example, there can be a significant correlation between the wiki views about the show, and the ratings, even when we take just the number of views (e.g., monthly averages) before the actual broadcast.

The deep learning algorithm can be trained to look the number of wiki views as its input, and the ratings as the output. The deep learning algorithm can predict the ratings fairly well, even without any other feature provided, using only the number of wiki exposures to the content. Other types of social media and content related page visits can also be utilized.

Figure 2:
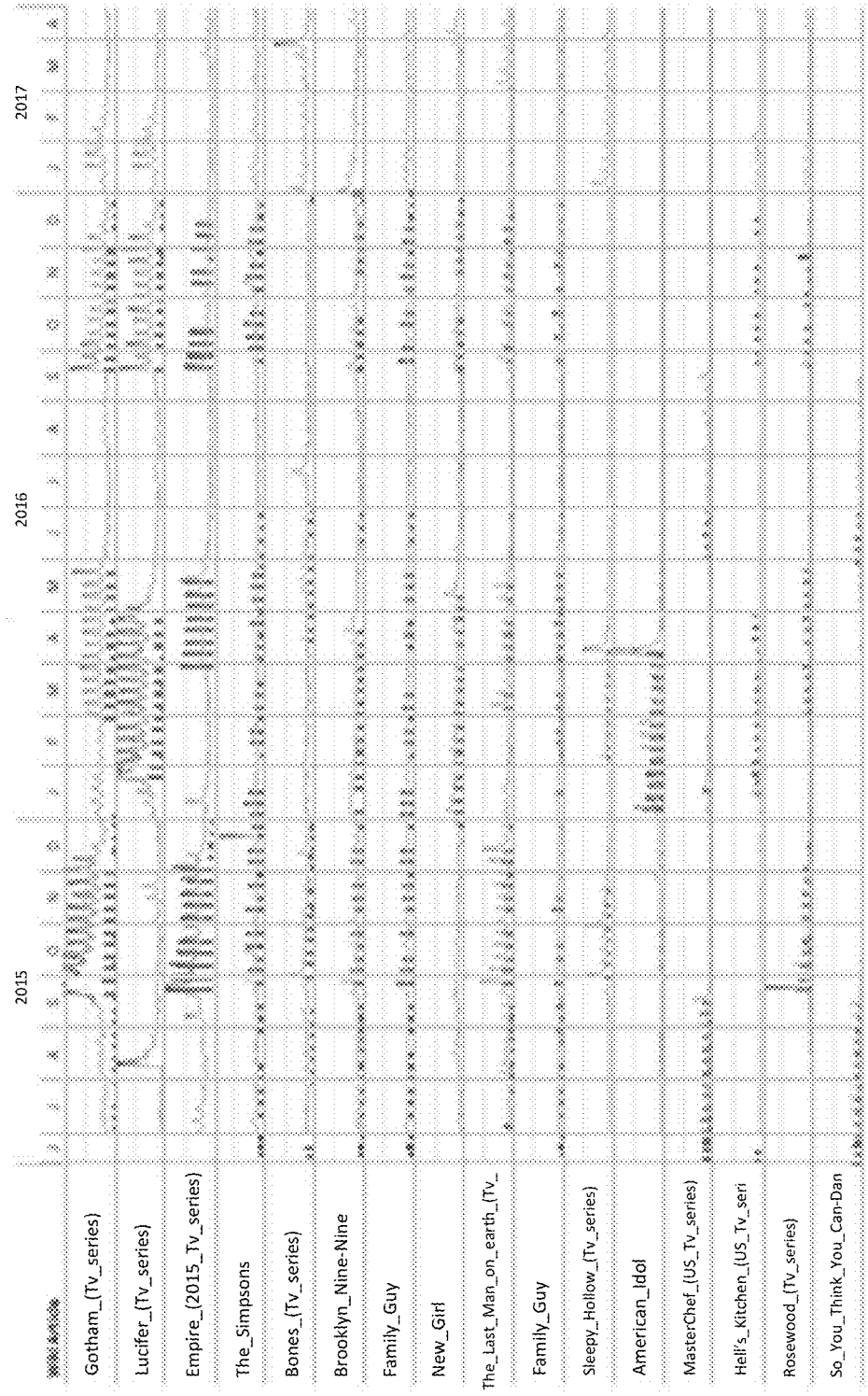
FIG. 2 is a graph of wiki views vs. actual ratings for example programs, according to aspects of the disclosure.

FIG. 2 shows a graph of wiki views vs. actual ratings for selected programs on FOX.

SOCIAL-BUZZ ANALYSIS ENRICHER ALGORITHM

Like the DNA, the role of the social buzz enricher can be to collect data from selected websites on the buzz around the content, while validating it against several parameters.
The collected data can be summarized as a buzz "best features" analysis and added as controlled input to the overarching algorithm.

OVERARCHING ALGORITHM

The overarching algorithm can use the above components, as well as many other components known to those of ordinary skill in the art, to create a prediction of audience viewership. It can includes, in addition to commonly used attributes, a deep analysis of the content context and/or the audience engagement (buzz) with the content, and thus analyze mass amounts of historical data in an advanced manner. The deep learning boosting algorithm (e.g., XGBOOST) can be used with added operational controls.

EXAMPLE ALGORITHMS AND FEATURES

Figure 4:
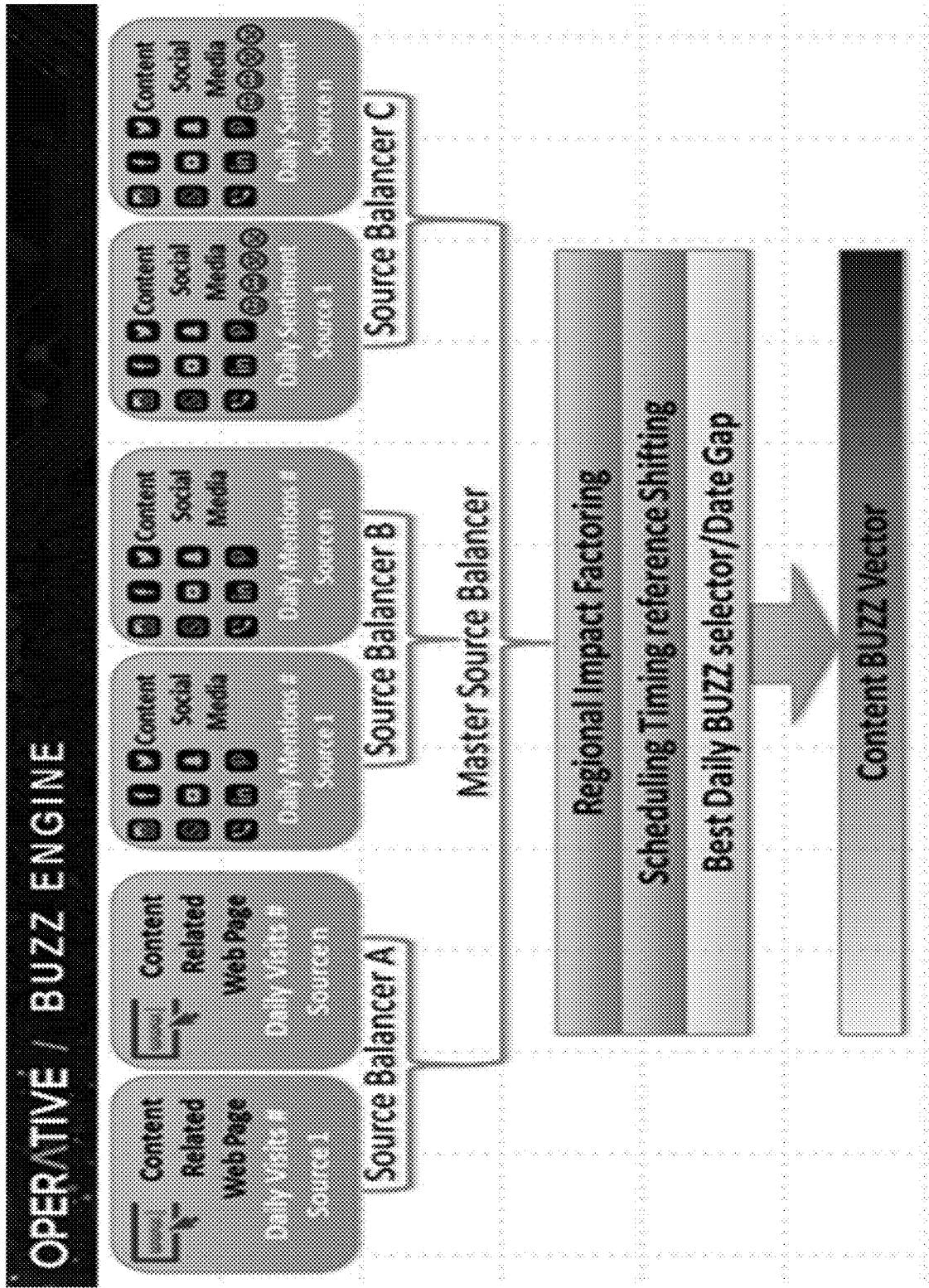
FIG. 4 illustrates several main buzz components that can be included in an example, according to aspects of the disclosure.

BUZZ Algorithm. FIG. 4 illustrates several main buzz components that can be included in an example embodiment. For example, a buzz analysis can be performed for the program to determine how much social media is generated related to the program, wherein the buzz analysis can comprise: searching pre-determined sources for identifying information, the identifying information comprising: an (Internet Movie DataBase) IMDB.com©, identifier, an official hashtag, an official program name, an actor name, or a director name, or any combination thereof, wherein the pre-determined source comprises WIKIPEDIA, TWITTER, FACEBOOK©, or web pages, or any combination thereof; counting how many times a day the identifying information is mentioned in the pre-determined sources; and providing a buzz rating based on the counting.

Figure 9:
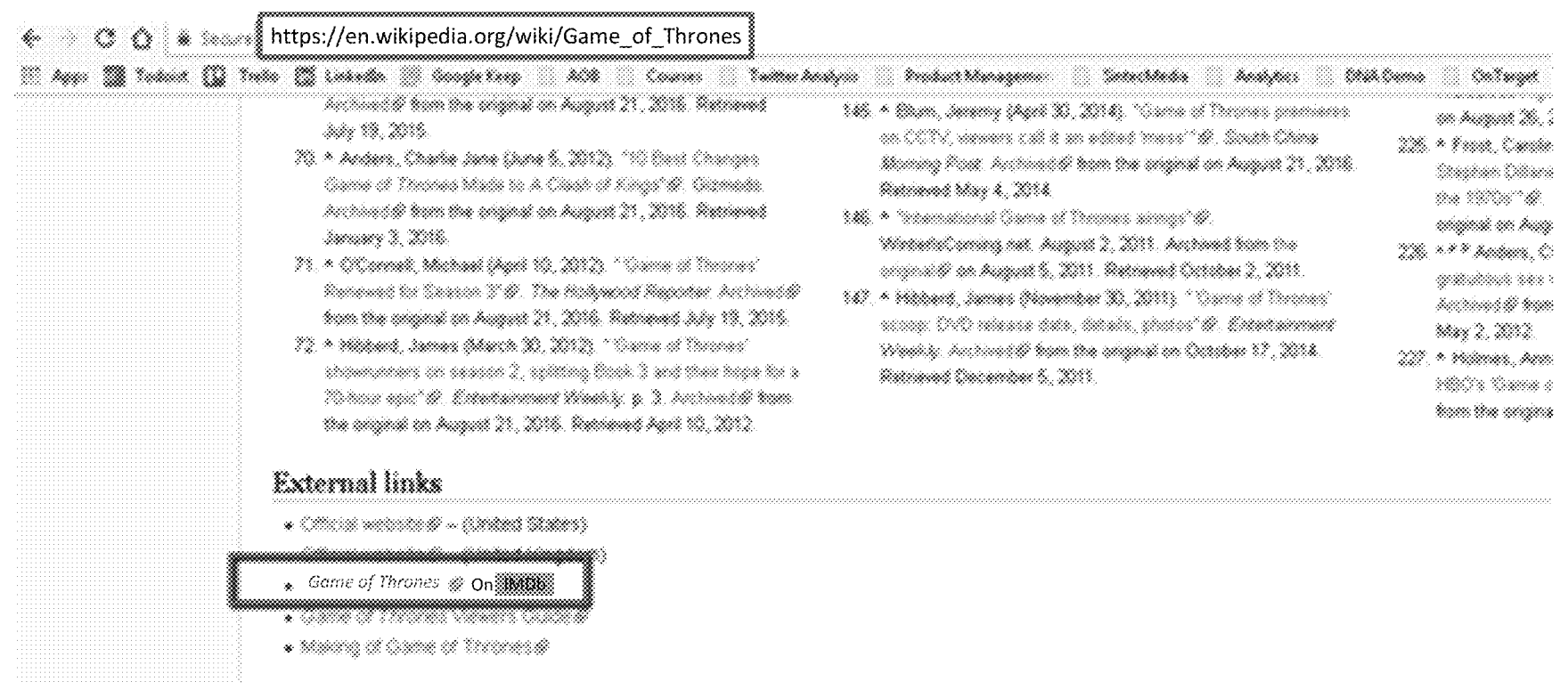
Figure 13:
FIG. 13 illustrates an example of data that can be collected and/or viewed related to WIKIPEDIA page visits, according to aspects of the disclosure.
Figure 14:
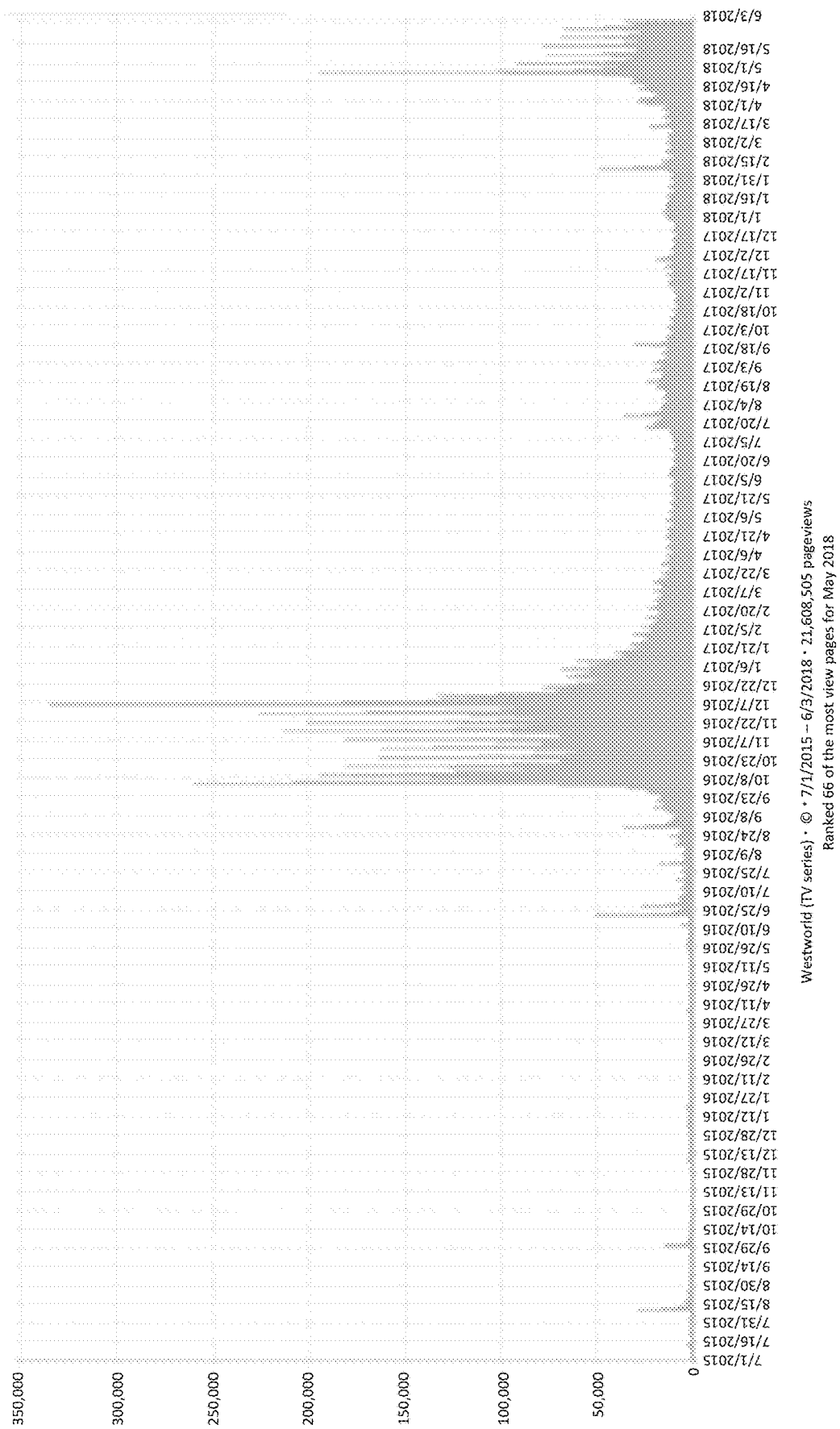
FIG. 14 illustrates another example of data that can be collected and/or viewed related to WIKIPEDIA page visits, according to aspects of the disclosure.

FIG. 9 provides an example of how an IMDB.com© identifier can be found using a WIKIPEDIA page. FIGS. 13 and 14 illustrate examples of data that can be collected and/or viewed related to WIKIPEDIA page visits.

Figure 15:
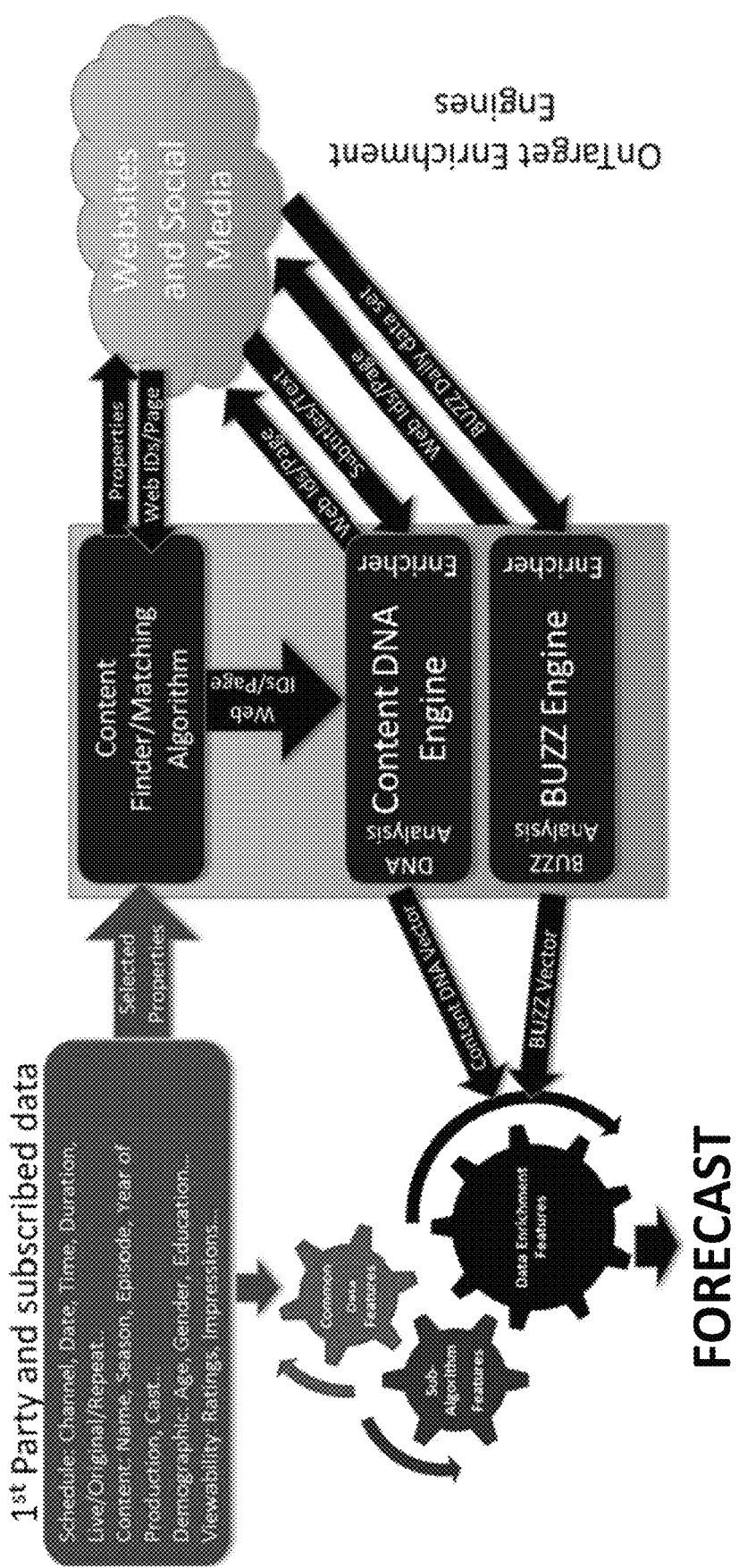
FIG. 15 illustrates components and data that can be used in some embodiments of a buzz analysis, according to aspects of the disclosure.

FIG. 15 illustrates components and data that can be used in some embodiments of a buzz analysis. The following BUZZ algorithm can be used in some embodiments:

$$BUZZ = \sum_{1}^{n}(CP+SM+SNT)*RG*TS$$

where:
CP—Content Pages—related web page daily number of visits
SM—Factored (see below) Social Media daily mentions
SNT—Daily average Sentiment Scoring—in some embodiments, can use host's own machine learning based user commentary sentiment scoring in some embodiments
RG—Regional source relevancy factor—can evaluate how a specific data source is relevant to the content airing region
TS—Time shift factor (see below)

Figure 5:
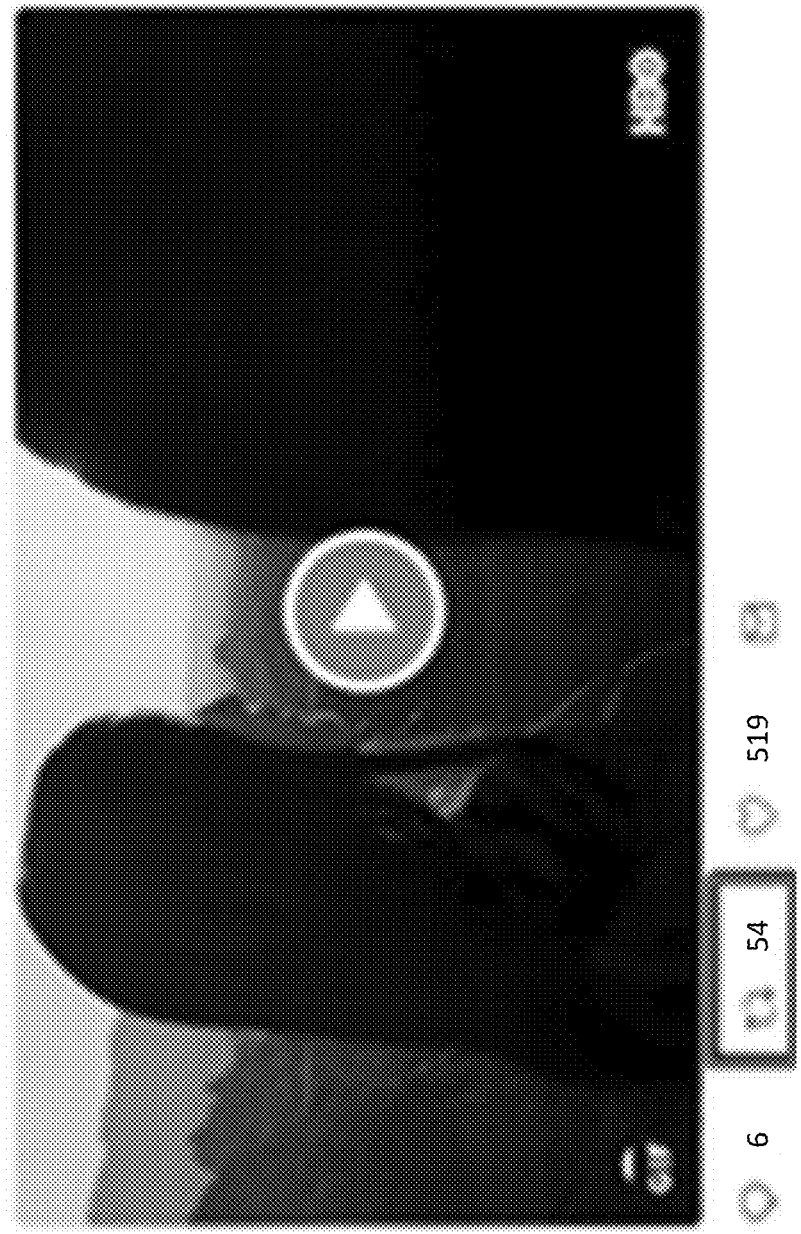
FIG. 5 is an example of messaging retweet information, according to aspects of the disclosure.
Figures 17, 18:
FIGS. 17 and 18 illustrate examples related to the social media count formula that can be used, according to aspects of the present disclosure.

Social Media Count. In some embodiments, the following factored Social Media (SM) mentions (e.g., count) can be determined as follows:

$$SM=\Sigma(PRT+SMP+SMS*SMSr)$$

where:
PRT—Primary account (@) retweets. Can comprise main account daily messaging retweets. For example, if given @westworldhbo, the information in FIG. 5 can be found.
SMP—Primary content hashtag (#) mentions. A content specific hashtag can ensure unique content identification. For example #empireFOX ensures not any "empire" related mention is checked. (See, for example, FIG. 17.)
In some cases multiple options could be used as a primary hashtag. For example, #westworld and #westworldhbo
SMS—Secondary content hashtag (#) mentions. For example, a main cast member, director, or a specific season, such as: #jonahnolan, #jjabrams, #westworldseason2. (See, for example, FIG. 18.)
SMSr—Secondary content hashtag (#). This can factor in the likelihood a secondary hashtag mention is contributing to BUZZ. For example, a season specific hashtag during airing can be set as extremely relevant (e.g., a 1.0 factor), while an actor hashtag mentioned on its own can be set as less relevant (e.g., 0.2 factor).

Time Shift Factor. Some data sources can provide user engagement during original airing of content. In some embodiments, the BUZZ algorithm can use information about a schedule in a different region or about a repeated airing long after the original airing. Examples comprise: a movie airing on TV (e.g., several months after the theatrical release), an originally-aired American network content being licensed to a different country, or a rerun of a series.

The following time shift algorithm can be used:

$$TS=K*(1/D*(Oa-Ea))$$

K—a set constant for each Time Shift reason (e.g., for a movie gap from a theatrical release, for a regional gap for an origin country release, or a time gap for an original release in the same region). The constant can be set by Machine Learning training on rating relations between the time shifted airing across the regions and/or sources.
D—Time decay factor. The can be how fast the BUZZ impact is reduced over ta imeline.
Oa—Original Airing and/or theater release date.
Ea—Evaluated airing date.

For example, FIG. 6 illustrates known data, gap and forecast periods. The BUZZ value can be calculated for historical data. However, for forecasting, the number of features generated can be limited to avoid performance and overfitting forecasting errors (e.g., see https://en.wikipedia.org/wiki/Overfitting, which is incorporated by reference for more information) Utilizing machine learning, specific gaps which evaluate the best pre-determined amount of features (e.g., 10), can be used. FIG. 7 provides an example where 5×daily values from the week before the data gap+the previous 5×weekly averages (to equal a total of 10) are used.

For example:
For data provided for US primetime data forecasting over 2 months data gap the following BUZZ pattern was established as most effective:

Secondary Hashtag Evaluation. As explained above, hashtags can be used to identify topics of social media discussions. Long-form content (e.g., movies and/or series) can be promoted via a common main hashtag (e.g., defined by an originator and/or publisher). Related sub-hashtags can evolve to denote a character, cast, plotline, season, etc. These sub-hashtags can be used on their own on sub-conversations that are still relevant to identify use engagement (e.g., BUZZ) with the evaluated content.

As these sub-hashtags may not be published and can be created by users in a more organic fashion, identifying them correctly can require either manual or algorithmic effort.

Figure 10:
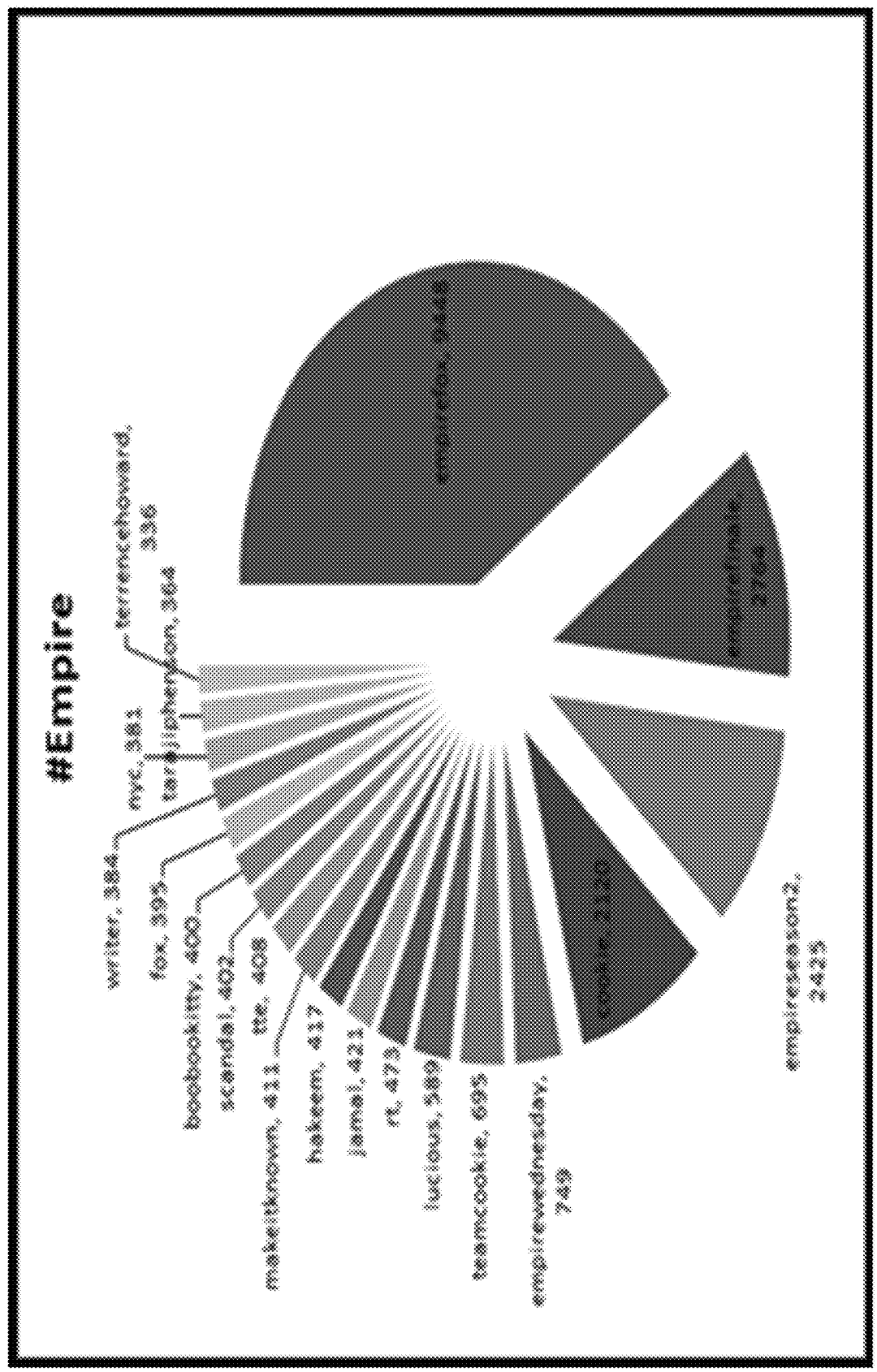
FIG. 10 illustrates an example algorithm that can be used to detects other hashtags that relate to specific content, according to aspects of the disclosure.

In some embodiments, an algorithm can be used that detects, based on pre-defined keywords (e.g., hashtags), other hashtags that relate to specific content one wants to follow. The algorithm can establish (e.g., using machine learning) the co-occurrence of other hashtags with the pre-defined (e.g., main) hashtags, and can decide, based on a pre-defined threshold, the significance of the keyword in relation to the initial words. FIG. 10 illustrates an example of this algorithm when #Empire is the pre-defined word. We can see secondary hashtags for the series finale, for season 2, for the main character (e.g., Cookie), etc. in FIG. 10.

Sentiment Analyzer. Many types of sentiment analyzers (e.g., tweetfeel or steamcrab for twitter, Newssift for online news) or generic engines (e.g., using revealed context, or IBM Watson) may be used in some embodiments. These solutions may report mainly 3 levels of response (e.g., positive, neutral, negative). They can evaluate vocabulary across all contexts (e.g. they can fit any product or service sentiment evaluation).

In other embodiments, an algorithm can be used that analyzes, based on opinionative text about a movie (e.g., IMDB.com© reviews), what is the sentiment, in a more variable resolution (e.g., ranking from 1 to 10). The algorithm can use NLP to pre-process the text and to make a representation of it that could be fed into ANN. The pre-processing can be similar to the one described on the DNA section, and can be based on Stanford's GloVe algorithm for word embedding, as well as on a K-means algorithm.

In a second stage, the algorithm can train an ANN on IMDB.com© reviews, where the input can be the text representation, and the output can be the user ratings. In this way, the ANN can learn to predict what will be the rating from the text.

Figure 11:
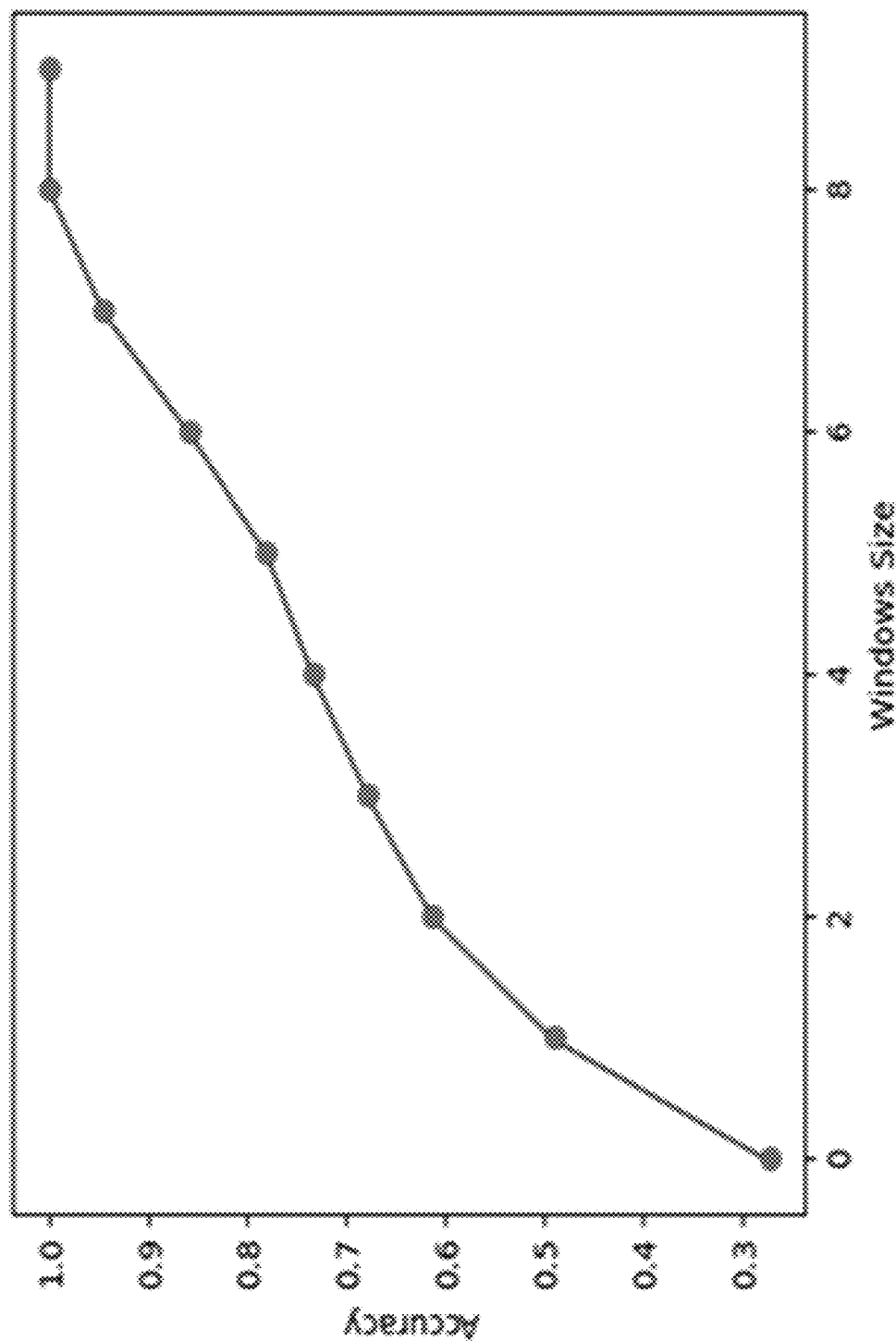
FIG. 11 illustrates an example graph of results for reviews that can be tested, according to aspects of the disclosure.

In an example training process, we can train on 1,220,000 reviews from 27,000 movies. The results on 120,000 reviews can be tested. FIG. 11 illustrates a graph of these results, with the window size being the difference between prediction and real value. We see that in almost 30% of the time, the results were accurate (e.g., while on a random guess the chances may be only 1/10). If the error tolerance grows to 1 (e.g., if the actual rating was 9 so the prediction could be 8, 9, or 10), the accuracy can grow to 50%, and can keep growing (as expected) as the error tolerance gets higher and higher.

Carry-Over Analysis. A parameters that can affect ratings prediction of a specific timed content, is the carry over effect (e.g., the lead-in analysis), which can evaluate: the impact of viewership of the previous program. This can have to do with many reasons (e.g., viewer habits of TV remote usage, level of engagement with content while watching TV, promo effort at the end of content to the coming next content, live vs. recorded watching habits, etc.). One challenge with the carry over analysis is that long term forecasting can be complicated, and the inaccuracy of the main program and the impact of the rating of the previous program can potentially increasing noise and not clear signal.

To avoid double forecasting (e.g., a rough estimate based on minimal input and accurate using mass input and "carrying-over" the rating from the previous program), we can train the algorithm only once, but feed it with the parameters of the previous program (e.g., whether the previous program is live and/or reply, ratings the previous program got in the past, etc.). When selecting the correct feature set of the previous program, the forecasting accuracy improvement can be improved.

Competitor(s) Analysis. Viewership can be impacted by audience viewing choices put in front of them. While linear viewing habits still exists, and some viewers randomly zap across channels and stop when engaged with currently played content, the shift to planned viewing (e.g., recorded or planned by listing and/or an Electronic Programming Guide (EPG)) is rising. This can lead to competition on the viewers' time, which can mean impact analysis may be required of content played at the same time across all available channels. Thus, in some embodiments, features taken from the main competitors of the predicted channel can be used in the algorithm. This can help to further improve the accuracy of the forecast.

Features such as the content DNA and/or BUZZ for the competitors content, can teach the neural network on the relationship of the competitor's popularity and DNA vs. DNA likelihood of swapping to view competitor's content (e.g., what percentage of specific demo users prefer to watch a popular police and/or drama series on a competitor's channel against the predicted spots event). While historical analysis (e.g., machine learning training) against accurate historical rating can ensure the model built for competition analysis can produce good forecasting results, we can add a degree of noise when referencing the competitors future scheduling, especially on long term forecasting, because these schedules can change last minute without long notification. In some embodiments, we also use a competitor's partial future schedule, as these may be published for a limited period in advance (e.g., a few weeks up to a quarter), while the main schedule that is analysed can be for a year or two in advance.

Series Sloping. Tree-based algorithms, like XGBOOST, may not be very good at predicting values outside of the range they already saw. That means, for example, that if our sequence is {5,4,3,2,1} the next predictions could be closer to {1,1,1, . . . } than to {0,−1,−2, . . . }. In other words: XGBOOST can be very good at interpolating but less good at extrapolating.

Figure 12:
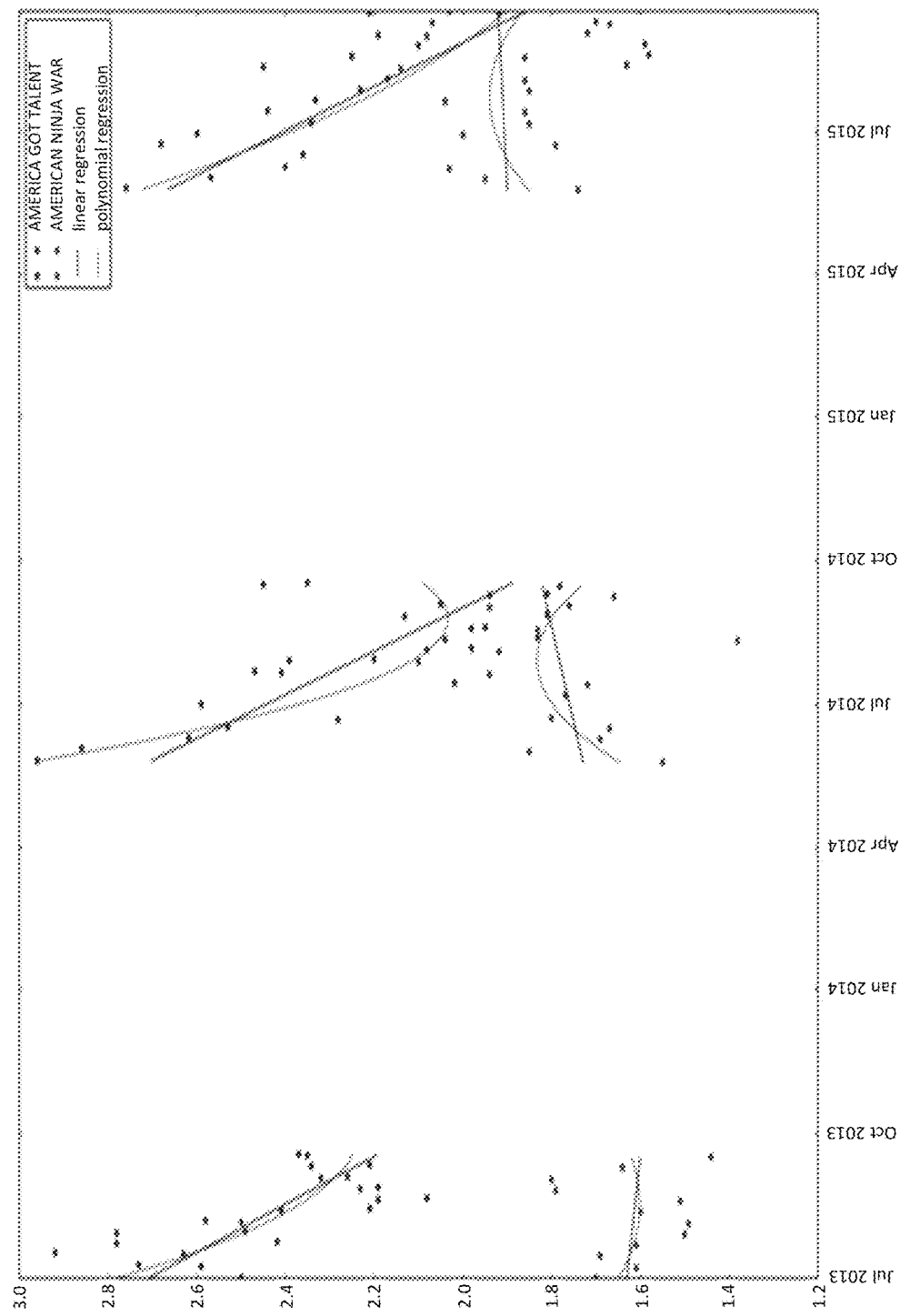
FIG. 12 illustrates a graph showing a linear regression and a second degree polynomial regression that can be calculated for example series, according to aspects of the disclosure.

In order to give the algorithm the capability to predict "outside of the box", we can include series sloping regressions, that can be linear and/or polynomial, in order to also take the long term trend into account. The graph in FIG. 12 shows the linear regression and the second degree polynomial regression that can be calculated for two example series (e.g., AMERICA'S GOT TALENT®/© & AMERICAN NINJA WAR©).

EXAMPLE COMPUTER IMPLEMENTATION

Methods described herein may represent processing that occurs within a system. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 1610 in FIG. 16) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 16:
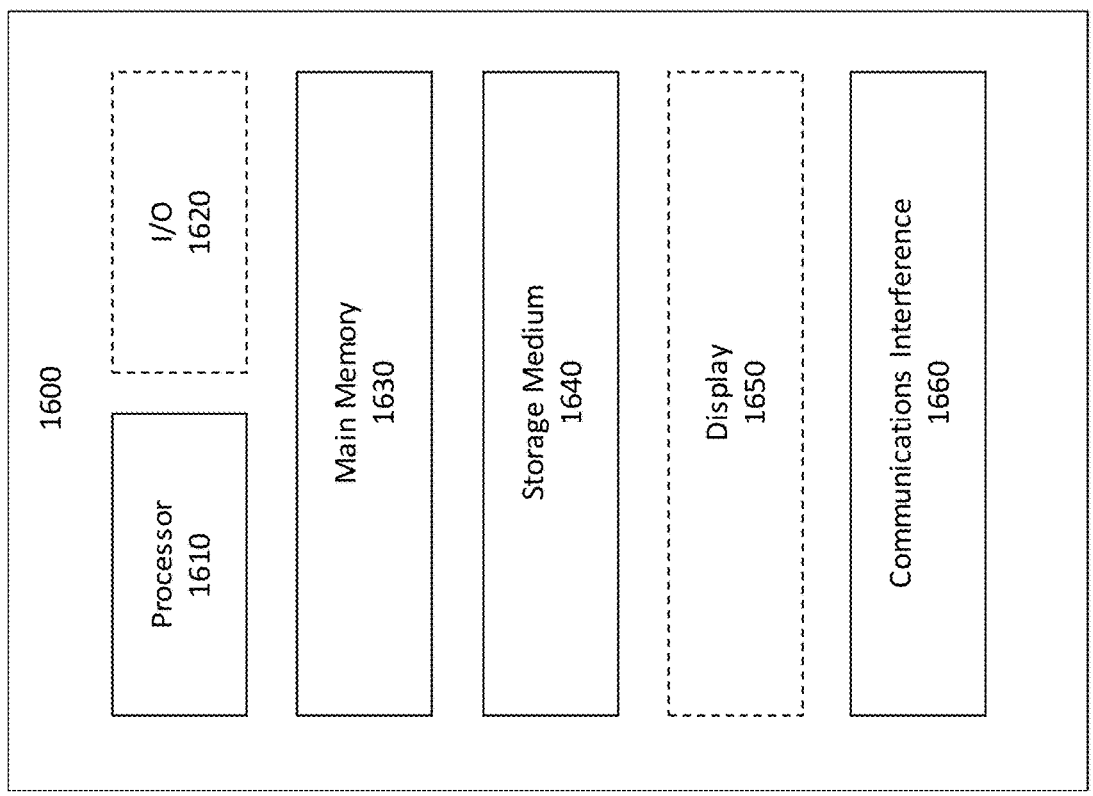
FIG. 16 illustrates an example computer, according to aspects of the present disclosure.

FIG. 16 illustrates an example computer 1605, according to some embodiments of the present disclosure. Computer 1605 can include a processor 1610 suitable for the execution of a computer program, and can include, by way of example, both general and special purpose microprocessors, and any one or more processor of any kind of digital computer. A processor can receive instructions and data from a memory 1630 (e.g., a read only memory or a random access memory or both). Processor 1610 can execute instructions and the memory 1630 can store instructions and data. A computer can include, or be operatively coupled to receive data from or transfer data to, or both, a storage medium 1640 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 1610 and the memory 1630 can be supplemented by, or incorporated in, special purpose logic circuitry.

The computer 605 can also include an input/output 1620, a display 1650, and a communications interface 1660.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

While the disclosure has been described with reference to numerous specific details, one of ordinary skill in the art will recognize that the disclosure can be embodied in other specific forms without departing from the spirit of the disclosure. In addition, a number of the figures illustrate processes. The specific operations of these processes may not be performed in the exact order shown, described, and/or claimed. The specific operations may not be performed in one continuous series of operations, and different specific operations may be performed in different embodiments. Thus, one of ordinary skill in the art would understand that the invention is not to be limited by the foregoing illustrative details, but rather is to be defined by the appended claims.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method for predicting who will be watching a television program, the method comprising:
    reviewing text related to the program, the text comprising: plot information, sub-title information, summary information, script information, or synopsis information, or any combination thereof;
    determining pre-determined genre words and pre-determined keywords correlating to ratings based on machine learning analysis of historical information comprising: historical ratings data, historical scheduling data, or content contextual data, or any combination thereof;
    determining which words from the text are relevant words, the relevant words being words that help identify genre words or keywords;
    determining how closely the relevant words coincide to the pre-determined genre words by generating a breakdown of how many relevant words are the pre-determined genre words and the pre-determined keywords; and
    using a machine learning model to train a neural network using data sets to: predict who will watch the program based on the breakdown and by evaluating audience social engagement using a buzz algorithm, wherein the buzz algorithm comprises:
        determining web site visit information by searching pre-determined web site sources for identifying information, the identifying information comprising: an Internet Movie Database (IMDB) identifier, an official hashtag, an official program name, or any combination thereof; and counting how many times a day the identifying information is mentioned in the pre-determined web site sources;
determining social media mention information;
determining user commentary sentiment scoring information;
determining regional source relevancy information;
determining time shift information comprising time shift reason information, time decay information, and original airing or original release information; and
performing a carryover analysis on the program to determine an impact of a previous program on whether persons will continue to watch a related program.

2. The method of claim 1, wherein a co-occurrence algorithm is used to determine which keywords to cluster together.

3. The method of claim 1, wherein the pre-determined web site sources comprise Wikipedia, and determining the web site visit information comprises using a Wikipedia pageview analysis count information for how many people are visiting a Wikipedia page or a group of Wikipedia pages.

4. The method of claim 1, wherein the program is a first aired new program, and a buzz analysis is performed for the first aired new program to determine how much social media is generated related to the first aired new program.

5. The method of claim 4, wherein the buzz analysis is utilized for different data gaps, the different data gaps comprising different time periods.

6. The method of claim 4, wherein a short term buzz analysis is performed to determine trend information, the trend information comprising whether buzz related to the program is going up or going down.

7. The method of claim 1, wherein a buzz analysis is performed for the program to determine how much social media is generated related to the program, wherein the buzz analysis related to the program, a cast member, or a director, or any combination thereof.

8. The method of claim 1, wherein a competitor analysis is performed on the program to analyze competitor information with respect to same or similar content, scheduled in the same time slot.

9. The method of claim 1, wherein the pre-determined web site sources comprise: a social media web site and/or a movie information web site.

10. The method of claim 1, wherein the identifying information further comprises an actor name, or a director name, or both.

11. The method of claim 1, wherein the historical ratings data is determine using: rating agency data, customer owned measured rating information, competitor rating information, or digital device viewing data, or any combination thereof.

12. The method of claim 11, wherein the rating agency data comprises ratings for demographic groups by time unit and/or program information, wherein the program information comprises network time, program name, duration, or any combination thereof.

13. The method of claim 1, wherein the historical scheduling data comprises content airing patterns and/or breakdown of content with break information from: a rating agency's basic scheduling data and/or a customer's own scheduling data.

14. The method of claim 1, wherein the historical information further comprises historical content metadata comprising: a content type, a year of production, a distributor, a cast member, or a box office statistic, or any combination thereof.

15. The method of claim 14, wherein the historical content metadata is provided by a Broadcast Management System (BMS) and/or a Rights Management System (RMS).

16. The method of claim 14, wherein machine learning and/or neuro linguistic programming algorithms are used to evaluate: scheduling time, rating by audience demographics, content metadata, content analysis, competitor viewership impact, series extended trend analysis, advanced time series analysis, or buzz information comprising audience engagement with content metrics, or any combination thereof.

17. The method of claim 1, wherein the social media mention information comprises: primary account daily messaging retweets, primary account content hashtag mentions; secondary account hashtag mentions, and secondary account content hashtag mentions.

18. The method of claim 1, wherein the time shift information comprises a set constant for each time shift reason.

19. The method of claim 1, wherein a set constant is set by machine learning training on rating relations between a time shifted airing across regions and/or sources.

20. The method of claim 1, wherein the time decay information comprises how fast a buzz impact, determined by the buzz algorithm, is reduced over a predetermined timeline.

21. The method of claim 1, wherein the time shift information comprises an evaluated airing date.

22. A system for predicting who is watching a television program, the system comprising:
processor configured to:
review text related to the program, the text comprising: plot information, sub-title information, summary information, script information, or synopsis information, or any combination thereof;
determine pre-determined genre words and pre-determined keywords correlating to ratings based on machine learning analysis of historical information comprising: historical ratings data, historical scheduling data, or content contextual data, or any combination thereof;
determine which words from the text are relevant words, the relevant words being words that help identify genre words or keywords;
determine how closely the relevant words coincide to the pre-determined genre words by generating a breakdown of how many relevant words are the pre-determined genre words and the pre-determined keywords; and
use a machine learning model to train a neural network using data sets to: predict who will watch the program based on the breakdown, by evaluating audience engagement with a buzz algorithm, wherein the buzz algorithm comprises:
determining web site visit information by searching pre-determined web site sources for identifying information, the identifying information comprising: an Internet Movie Database (IMDB) identifier, an official hashtag, an official program name, or any combination thereof; and counting how many times a day the identifying information is mentioned in the pre-determined web site sources;
determining social media mention information;
determining user commentary sentiment scoring information;

determining regional source relevancy information;
determining time shift information comprising time shift reason information, time decay information, and original airing or original release information; and
performing a carryover analysis on the program to determine an impact of a previous program on whether persons will continue to watch a related program.

23. The system of claim 22, wherein a co-occurrence algorithm is used to determine which keywords to cluster together.

24. The system of claim 22, wherein the pre-determined web site sources comprise Wikipedia, and determining the web site visit information comprises using a Wikipedia pageview analysis count information for how many people are visiting a Wikipedia page or a group of Wikipedia pages.

25. The system of claim 22, wherein the program is a first aired new program, and a buzz analysis is performed for the first aired new program to determine how much social media is generated related to the first aired new program.

26. The system of claim 25, wherein the buzz analysis is utilized for different data gaps, the different data gaps comprising different time periods.

27. The system of claim 22, wherein a short term buzz analysis is performed to determine trend information, the trend information comprising whether buzz related to the program is going up or going down.

28. The system of claim 22, wherein a buzz analysis is performed for the program to determine how much social media is generated related to the program, wherein the buzz analysis related to the program, a cast member, or a director, or any combination thereof.

29. The system of claim 22, wherein a competitor analysis is performed on the program to analyze competitor information with respect to same or similar content, scheduled in the same time slot.

30. The system of claim 22, wherein the pre-determined web site sources comprise: a social media web site and/or a movie information web site.

31. The system of claim 22, wherein the identifying information further comprises comprising: an actor name, or a director name, or both.

32. The system of claim 22, wherein the historical ratings data is determine using: rating agency data, customer owned measured rating information, competitor rating information, or digital device viewing data, or any combination thereof.

33. The system of claim 32, wherein the rating agency data comprises ratings for demographic groups by time unit and/or program information, wherein the program information comprises network time, program name, duration, or any combination thereof.

34. The system of claim 22, wherein the historical scheduling data comprises content airing patterns and/or breakdown of content with break information from: a rating agency's basic scheduling data and/or a customer's own scheduling data.

35. The system of claim 22, wherein the historical information further comprises historical content metadata comprising: a content type, a year of production, a distributor, a cast member, or a box office statistic, or any combination thereof.

36. The system of claim 35, wherein the historical content metadata is provided by a Broadcast Management System (BMS) and/or a Rights Management System (RMS).

37. The system of claim 35, wherein machine learning and/or neuro linguistic programming algorithms are used to evaluate: scheduling time, rating by audience demographics, content metadata, content analysis, competitor viewership impact, series extended trend analysis, advanced time series analysis, or buzz information comprising audience engagement with content metrics, or any combination thereof.

38. The system of claim 22, wherein the social media mention information comprises: primary account daily messaging retweets, primary account content hashtag mentions; secondary account hashtag mentions, and secondary account content hashtag mentions.

39. The system of claim 22, wherein the time shift information comprises a set constant for each time shift reason.

40. The system of claim 22, wherein a set constant is set by machine learning training on rating relations between a time shifted airing across regions and/or sources.

41. The system of claim 22, wherein the time decay information comprises how fast a buzz impact, determined by the buzz algorithm, is reduced over a predetermined timeline.

42. The system of claim 22, wherein the time shift information comprises an evaluated airing date.

* * * * *